(12) United States Patent
Wang

(10) Patent No.: US 7,234,821 B2
(45) Date of Patent: Jun. 26, 2007

(54) PROJECTION DEVICE HAVING SINGLE LIGHT VALVE

(75) Inventor: Sze-Ke Wang, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 89 days.

(21) Appl. No.: 10/711,880

(22) Filed: Oct. 12, 2004

(65) Prior Publication Data

US 2006/0077358 A1    Apr. 13, 2006

(51) Int. Cl.
  *G03B 21/14*  (2006.01)
  *G03B 21/26*  (2006.01)
(52) U.S. Cl. .............................. 353/97; 353/84; 353/30
(58) Field of Classification Search ................ 353/97, 353/99, 84, 31; 359/885; 348/742–744; 349/5, 7, 8
See application file for complete search history.

(56) References Cited

U.S. PATENT DOCUMENTS

| 5,337,097 A * | 8/1994 | Suzuki et al. ................ 353/101 |
| 2004/0135975 A1* | 7/2004 | Wang ............................ 353/84 |
| 2004/0257535 A1* | 12/2004 | Tanaka et al. ................. 353/31 |
| 2005/0018145 A1* | 1/2005 | Kwon et al. ................... 353/84 |

FOREIGN PATENT DOCUMENTS

| JP | 04-139434 | 5/1992 |
| JP | 3003022 | 8/1994 |
| JP | 08-184927 | 7/1996 |
| JP | 2001-147485 | 5/2001 |
| JP | 2003-167297 | 6/2003 |

* cited by examiner

*Primary Examiner*—Melissa Jan Koval
*Assistant Examiner*—Andrew Kong
(74) *Attorney, Agent, or Firm*—Jiang Chyun IP Office (57) ABSTRACT

A projection device having single light valve has a light source, a projection lens, an imaging unit and a beam breaker. Moreover, the imaging unit has a color production device and a valve. When the beam provided by light source propagates to the color production device, the color production device converts the beam into several different color beams in an order. Thereafter, the beams propagate to the beam breaker, and the beam breaker breaks the beam propagating through within a definite time according to the states of imaging unit. Afterwards, the beams that are not broken are converted into images by the light valve in order, and projected on a screen by projection lens. The beam breaker module can enable the projection device having single light to have several situation modes, and maintain the imaging contrast.

20 Claims, 7 Drawing Sheets

PROJECTION DEVICE HAVING SINGLE LIGHT VALVE

BACKGROUND OF THE INVENTION

1. Field of Invention

The present invention relates to a projection device having single light valve. More particularly, the present invention relates to a projection device having single light valve, which can be operated under various operation modes with the effect of image contrast simultaneously.

2. Description of Related Art

In recent years, the cathode ray tube (CRT) projection device, which has large volume and is heavy, has been gradually replaced by the products, such as the LCD projection device and digital light processing (DLP) projection device. These products has the characteristics of being light and portable, and can be directly coupled with the digital products, so as to display the image by projection. Under the situation that the manufacturers are continuously developing cheaper and competitive products with additional function, these products can not only be used in company, school, or a public area for briefing, but also gradually be developed as a tool for viewing a movie at home. Wherein, the use in briefing needs high brightness, but the use for view the movie needs high saturation degree. In this consideration, it is a trend to have a projection device, which has capability of both high brightness and high saturation.

Figure 1:
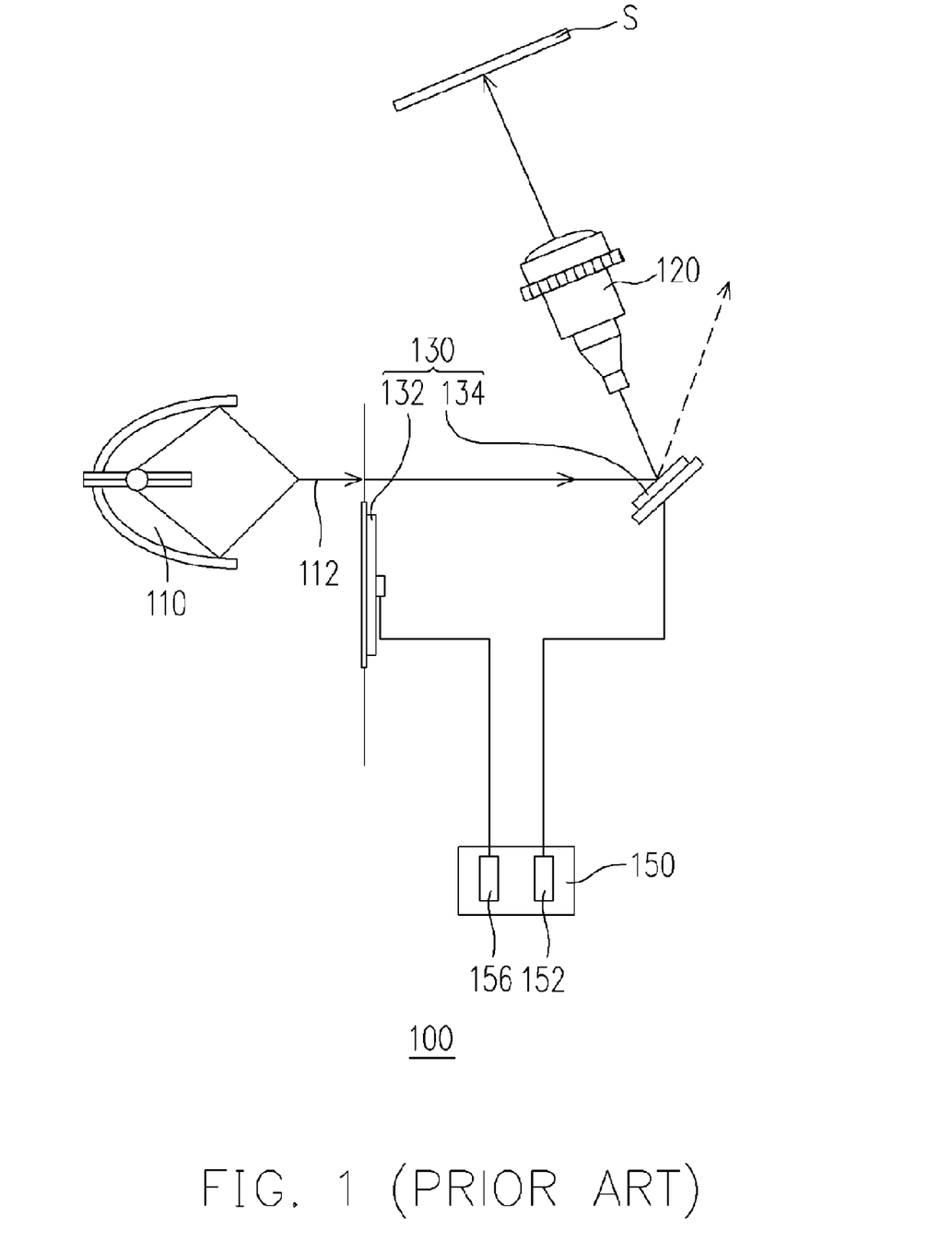
FIG. 1 is a drawing, schematically illustrating the structure of a conventional projection device having single light valve.

FIG. 1 is a drawing, schematically illustrating the structure of a conventional projection device having single light valve. In FIG. 1, the conventional projection device having single light valve 100 includes a light source 110, a projection lens 120, an image unit 130, and a control unit 150. Wherein, the light source 110 is used to provide a light beam 112. In addition, the projection lens 120 is disposed behind the light source 110, and is on the propagating path of the light beam 112.

In the foregoing projection device having single light valve 100, the image unit 130 is disposed between the light source 110 and the projection lens 120, and is on the propagating path of the light beam 112. The conventional image unit 130 includes a color wheel 132 and a digital micro-lens device 134, wherein the digital micro-lens device 134 is disposed behind the color wheel 132, and is on the propagating path of the light beam 112. The control unit 150 is used to synchronously control the color wheel 132 and the digital micro-lens device 134. The control unit 150 includes a color wheel driver 156 and a digital micro-lens device driver 152. Wherein the digital micro-lens device driver 152 is electrically coupled to the digital micro-lens device 134, and the color wheel driver 156 is electrically coupled to the color wheel 132. In addition, the digital micro-lens device driver 152 and the color wheel driver 156 of the control unit 150 are used to synchronously control the digital micro-lens device 134 and the color wheel 132.

According to the foregoing descriptions, the light beam 112 provided by the light source 110 propagates to the color wheel 132 of the image unit 130. And then, the color wheel driver 156 of the control unit 150 controls the color wheel 132 being electrically coupled thereto, so as to sequentially divide the light beam 112 into light beams 112 in different colors. Then, these light beams 112 are sequentially incident to the digital micro-lens device 134 with multiple pixel units, which are controlled by the digital micro-lens device driver 152, which is electrically coupled therewith, so as to have the displaying states of ON state or Off state. The pixel units with the ON state cause the light beams 112 to be reflected to the projection lens 120. The pixel units with the OFF state cause the light beams 112 to be deviating off the projection lens 120. After then, the projection lens 120 projects the light beams (image), which have been processed by the digital micro-lens device 134, onto the screen S.

According to the foregoing descriptions, the conventional projection device having single light valve 100 uses the color wheels 132 with red (R) filtering region, green (G) filtering region, and blue (B) filtering region. However, since the spoke regions between each of the color filtering regions on the color wheel 132 have the noise light, the color saturation of the projected image would get worse. In addition, since the dark image (all of the pixel units of the digital micro-lens device are at OFF state) still has some noise light, the contrast of the projected image is lowered either.

In order to increase the image brightness for allowing the projection device having single light valve 100 to have various operation modes with high brightness and high color saturation, the conventional technology needs to use the color wheel 132 with the red filtering region, the green filtering region, the blue filtering region, and the white (W) filtering region for increasing the image brightness, but the color saturation would be reduced in this manner. When the mode with high color saturation is needed, the digital micro-lens device driver 152 does not process a portion or the whole of the light beam that passes through the white filtering region, or does not process a portion or the whole of the light beam that passes through each of the filtering regions, so as to increase the color saturation. In the foregoing methods, under the high brightness mode, the brightness for the white image is the brightness from the R, G, B, and W light beams. The brightness of the dark image is due to the brightness of noise lights from the R, G, B, and W light beams. When under the high color saturation mode, the brightness for the white image is the brightness from the R, G, B, and W light beams and the brightness of the dark image is also due to the brightness of noise lights from the R, G, B, and W light beams. Therefore, the image brightness of white image under the high color saturation mode would decrease, and the noise light from the W light beam still exists in the dark image, and the brightness of the dark image is not changed. As a result, the contrast under the high color saturation mode is reduced. The data is shown in Table 1 for clear comparison on the difference:

TABLE 1

|  | Brightness for white image | Brightness for dark image | Contrast |
|---|---|---|---|
| High brightness mode | 1000 (Lux) | 1 (Lux) | 1000 |
| High color saturation mode | 500 (Lux) | 1 (Lux) | 500 |

Therefore, the foregoing projection device cannot be adapted to various operation modes, such as high image brightness or high color saturation, to always provide the better contrast.

SUMMARY OF THE INVENTION

One of the objects of the invention is to provide a projection device having single light valve, which can be used in various operation modes with consideration of image contrast.

For at least achieving the foregoing object, the invention provides a projection device having single light valve, suitable for use to project an image to a screen. The projection device having single light valve includes a light source, a projection lens, an image unit, and a beam breaker module. Wherein, the light source is used to provide a light beam. In addition, the projection lens is disposed behind the light source and is located on the propagation path of the light beam.

In the foregoing projection device having single light valve, the image unit is disposed between the light source and the projection lens, and is located on the propagation path of the light beam. This image unit includes a color production device and a light valve. Wherein, the light valve is disposed behind the color production device, and is located on the propagation path of the light beam. In addition, the beam breaker module is disposed between the light source and the screen, and is located on the propagation path of the light beam. Wherein, the beam breaker module is to break the passing light beam within a specific time period, according to the state of the color production device.

In the foregoing projection device having single light valve, the color production device includes a color wheel. The color wheel includes, for example, a red filtering region, a green filtering region, and a blue filtering region, or includes a red filtering region, a green filtering region, a blue filtering region, and a white filtering region. In addition, the color wheel can include, for example, a yellow (Y) filtering ring, a magenta (M) filtering region, and a cyan (C) filtering region, or includes a yellow filtering ring, a magenta filtering region, a cyan filtering region, and a white (W) filtering region.

In the foregoing projection device having single light valve, the color production device includes, for example, a color drum. The color drum includes, for example, a red filtering region, a green filtering region, and a blue filtering region, or includes a red filtering region, a green filtering region, a blue filtering region, and a white filtering region. In addition, the color drum can include, for example, a yellow (Y) filtering ring, a magenta (M) filtering region, and a cyan (C) filtering region, or includes a yellow filtering ring, a magenta filtering region, a cyan filtering region, and a white (W) filtering region.

In the foregoing projection device having single light valve, the light valve includes, for example, a liquid crystal display, a digital micro-lens device, or a reflective-type liquid crystal on silicon (LCOS) display.

In the foregoing projection device having single light valve, the beam breaker module is disposed, for example, between the light source and the image unit, in the image unit, between the image unit and the projection lens, in the projection lens, or between the projection lens and the screen. The beam breaker module includes, for example, an optical sensor, a beam breaking part, and an actuator. In addition, the optical sensor is disposed beside the color production device, so as to sense the state of the color production device. Moreover, the beam breaking part is between the light source and the screen, and the actuator is coupled with the beam breaking part.

In the foregoing projection device having single light valve, for example, it further includes a control unit to synchronously control the color production device, the light valve and the beam breaker module. The control unit includes, for example, a light valve driver, an actuator driver, and a color production device driver. Wherein, the light valve driver is electrically coupled with the light valve. In addition, the actuator driver and the actuator are electrically coupled, so as to control the beam breaking part. In addition, the color production device driver and the color production device driver are electrically coupled, wherein the light valve driver, the actuator driver and the color production device driver in synchronous use to control the light valve, the beam breaker module, and the color production device.

The invention uses the beam breaker module, which is disposed between the light source and the screen, and is on the light propagation path. This beam breaker module can break the light beam within a specific time period, according to the state of the color production device. Therefore, the projection device having single light valve can be used in various operation modes with capability of maintaining the contrast.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 2:
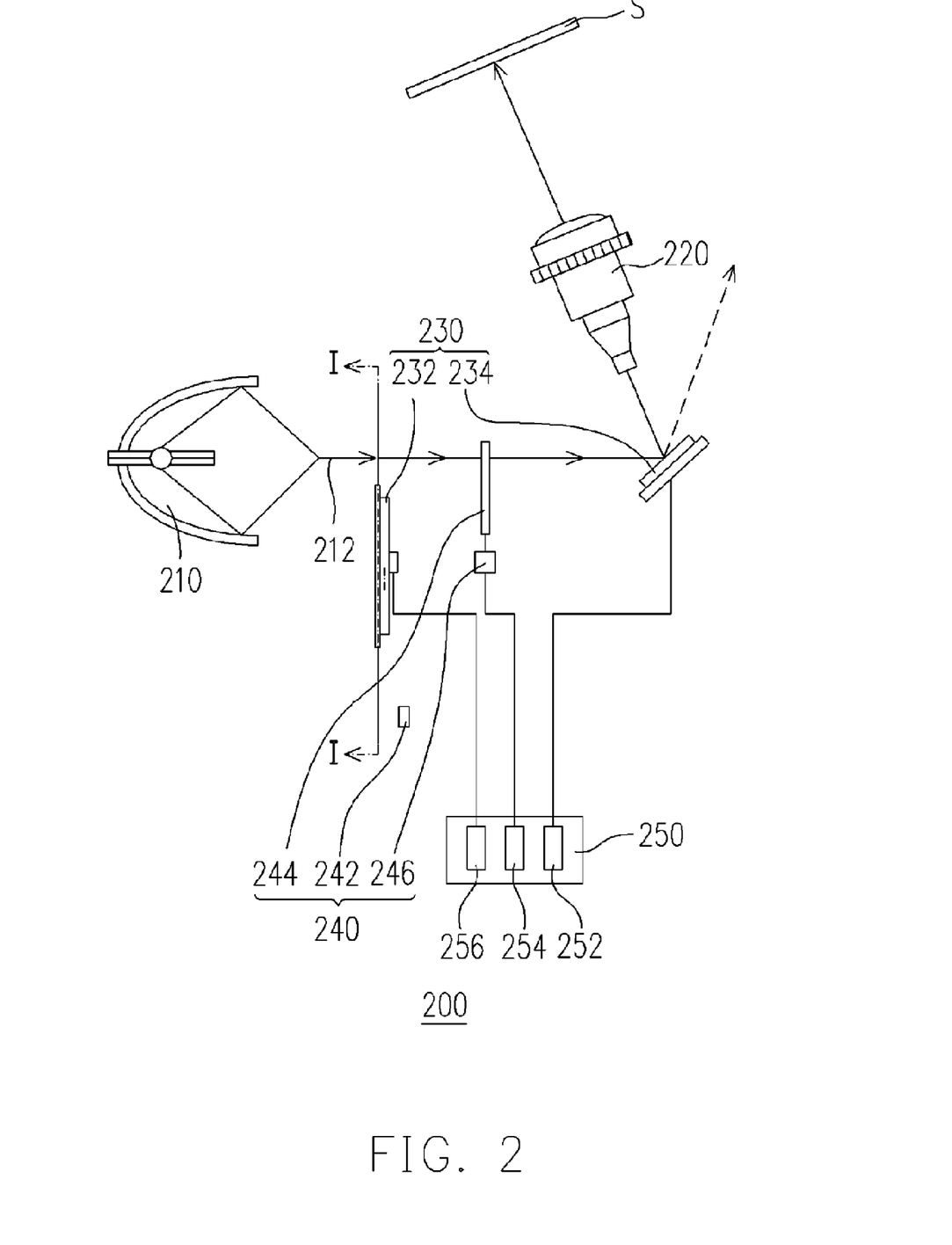
FIG. 2 is a drawing, schematically illustrating the structure of a projection device having single light valve, according to an embodiment of the present invention.

FIG. 2 is a drawing, schematically illustrating the structure of a projection device having single light valve, according to an embodiment of the present invention. In FIG. 2, the invention proposes a projection device having single light valve 200, which can project an image (not shown) to a screen S. The projection device having single light valve 200 includes a light source 210, a projection lens 220, an image unit 230, and a beam breaker module 240. In the foregoing projection device having single light valve 200, the light source 210 can provide a light beam 212. The projection lens 220 is disposed behind the light source 210, and is located on the propagation pat of the light beam 212. In addition, the image unit 230 is disposed between the light source 210 and the projection lens 220, and is located on die propagation path of the light beam 212.

In the embodiment of the invention, the image unit 230 includes, for example, a color production device 232 and a light valve 234. Wherein, the light valve 234 is disposed behind the color production device 232, and is located on the propagation path of the light beam 212. In addition, the beam breaker module 240 is, for example, disposed between the light source 210 and the screen S, and the beam breaker module 240 can selectively cut in or cut out the propagation path of the light beam. When the beam breaker module 240 cuts in the propagation path of the light beam, the beam breaker module 240 can break the passing light beam within a specific time period according to the state of the color production device 232.

In the foregoing projection device having single light valve 200, the color production device 232 includes for example a color wheel or a color drum, wherein the color wheel is shown in FIG. 2. Moreover, the color wheel (color drum) is composed of several filtering regions in various arrangements, such as a red color filtering region, a green filtering region, and a blue filtering region, or a red color filtering region, a green filtering region, a blue filtering region, and a white filtering region. It can also include a yellow filtering region a magenta filtering region, and a cyan filtering region, or include a yellow filtering region, a magenta filtering region, a cyan filtering region, and a white filtering region.

In the foregoing projection device having single light valve 200, the beam breaker module 240 includes, for example. an optical sensor 242, a beam breaking part 244 and an actuator 246. Wherein, the optical sensor 242 is disposed beside the color production device 232, so as to sense the state of the color production device 232. Moreover, the beam breaking part 244 can include metal plate or a plate with black coating the surface, so as to reflect or absorb the light beam. The actuator 246 is coupled with the beam breaking part 244, so as to control the beam breaking part 244 to cut in or cut out from the propagation path of the light beam. The actuator 246 can be a motor or a magnetic switch.

Figure 4A:
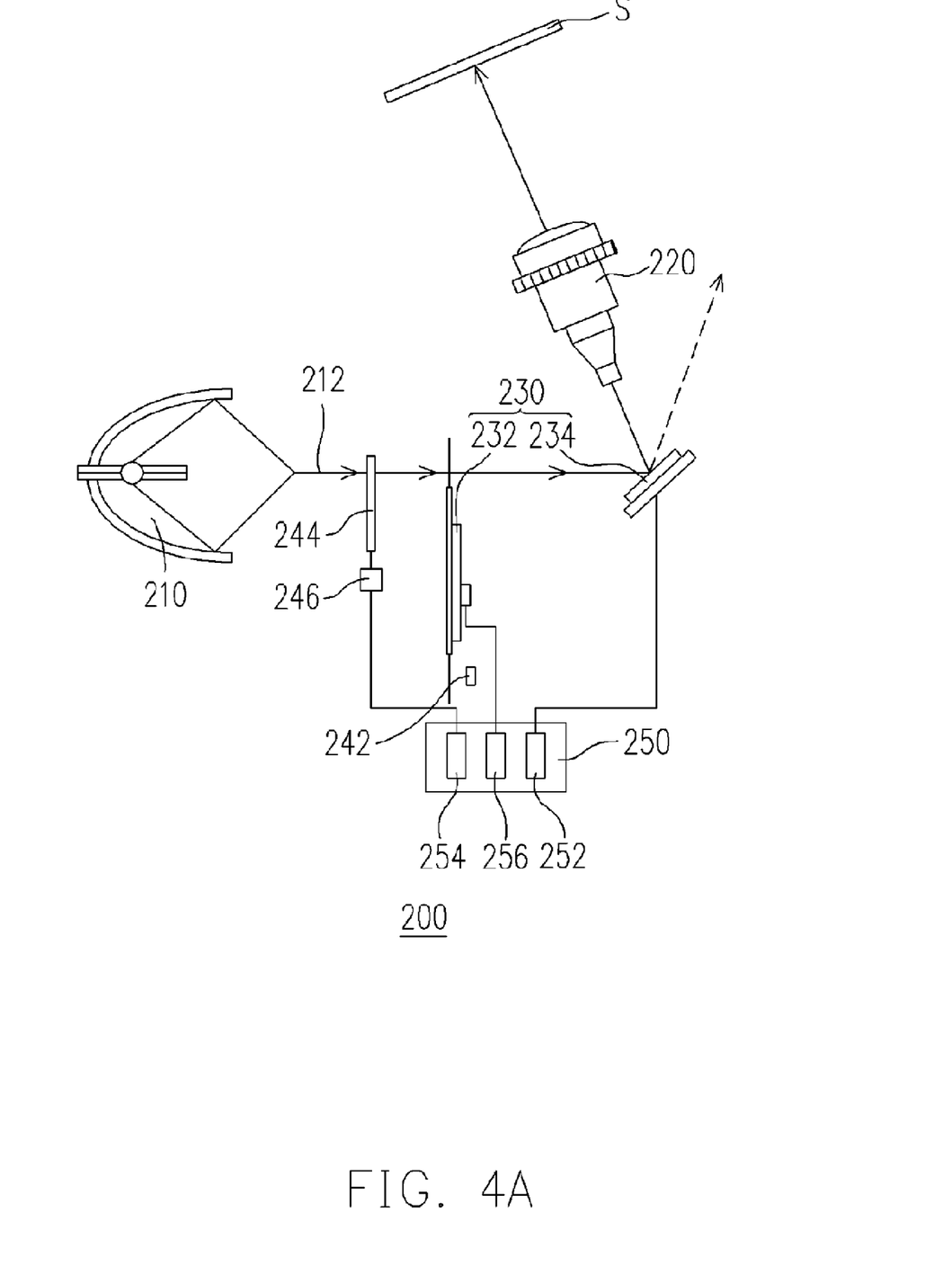
FIGS. 4A-4D are drawings, schematically illustrating disposing positions of the beam breaking part.
Figure 4B:
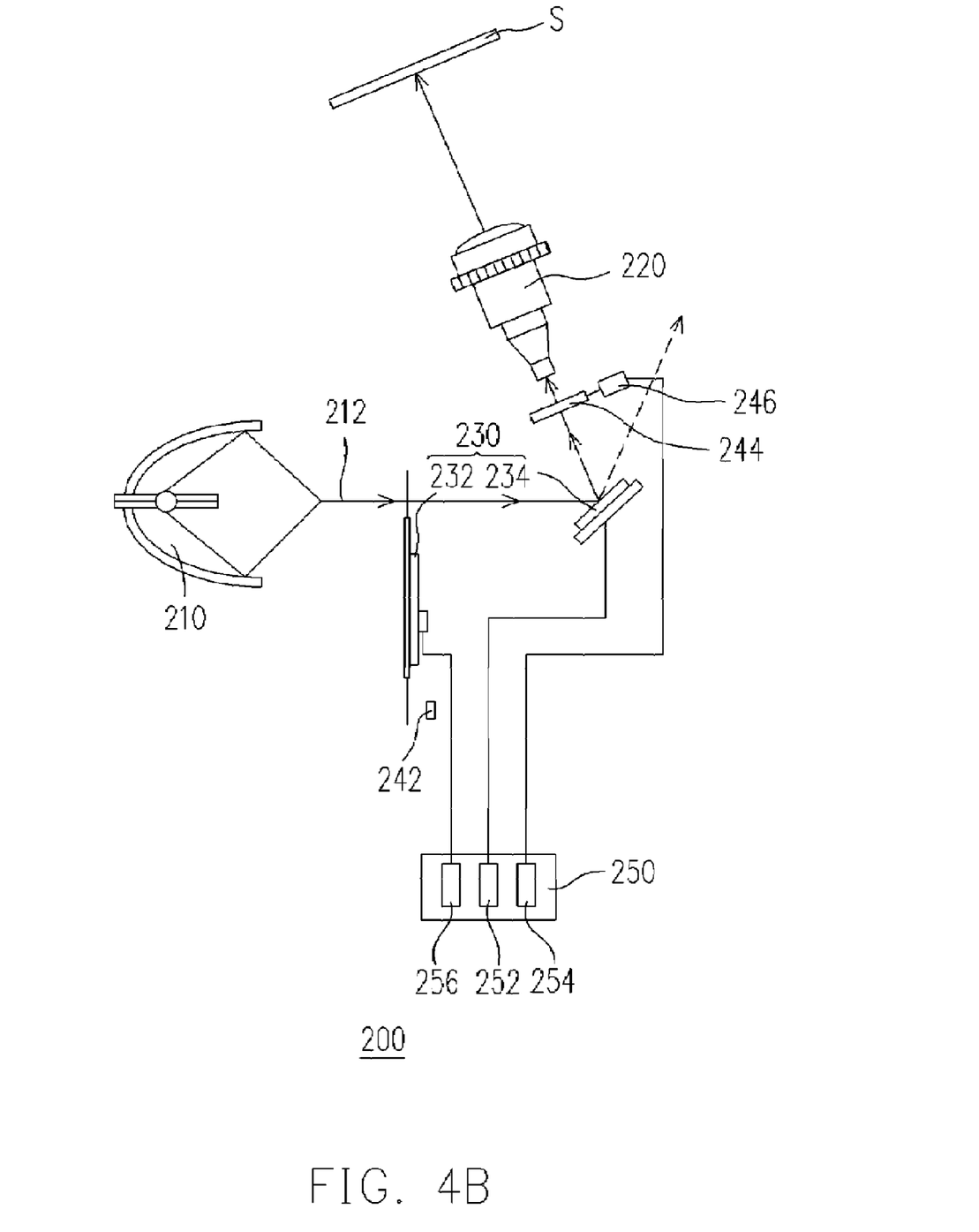
Figure 4C:
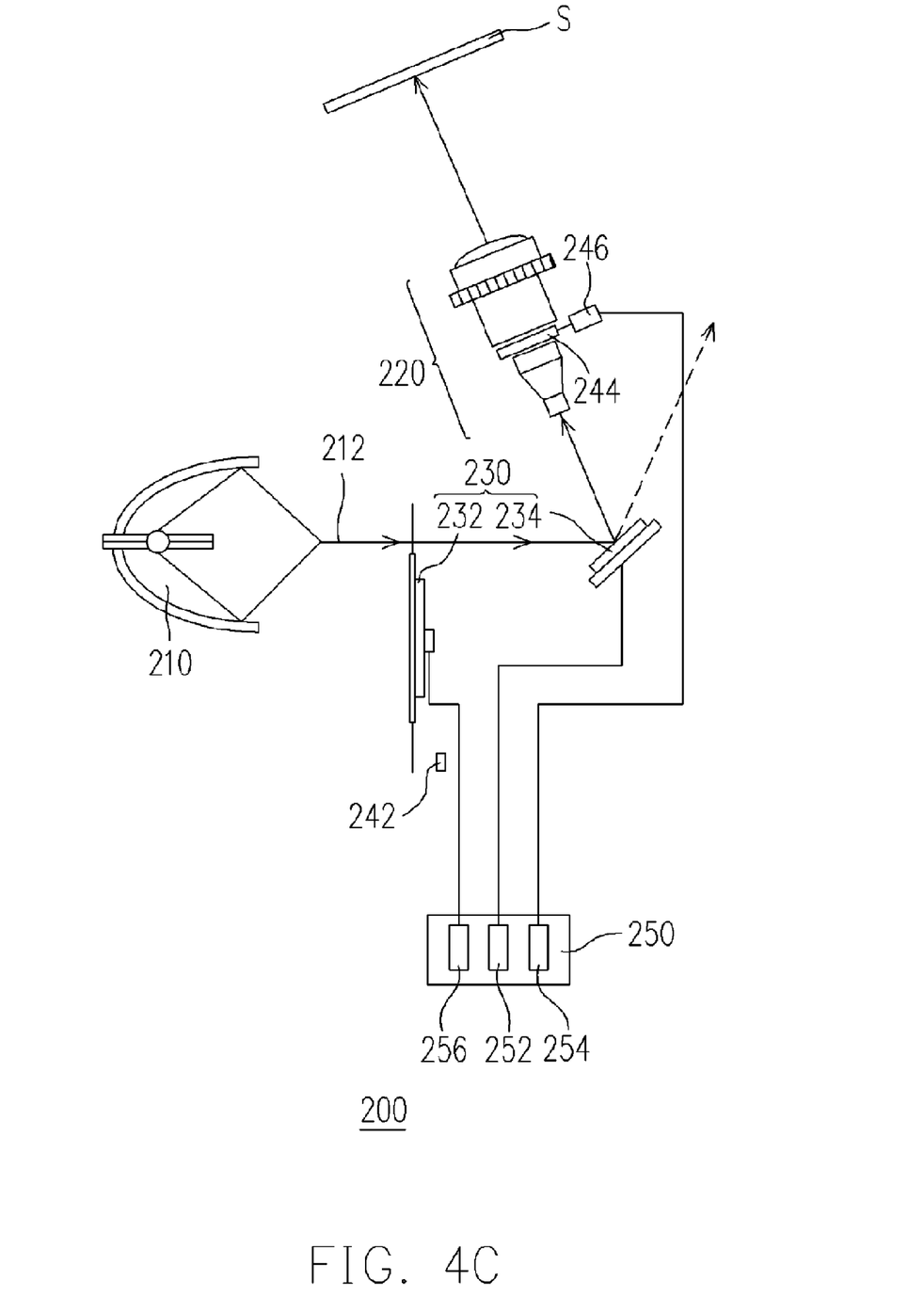
Figure 4D:
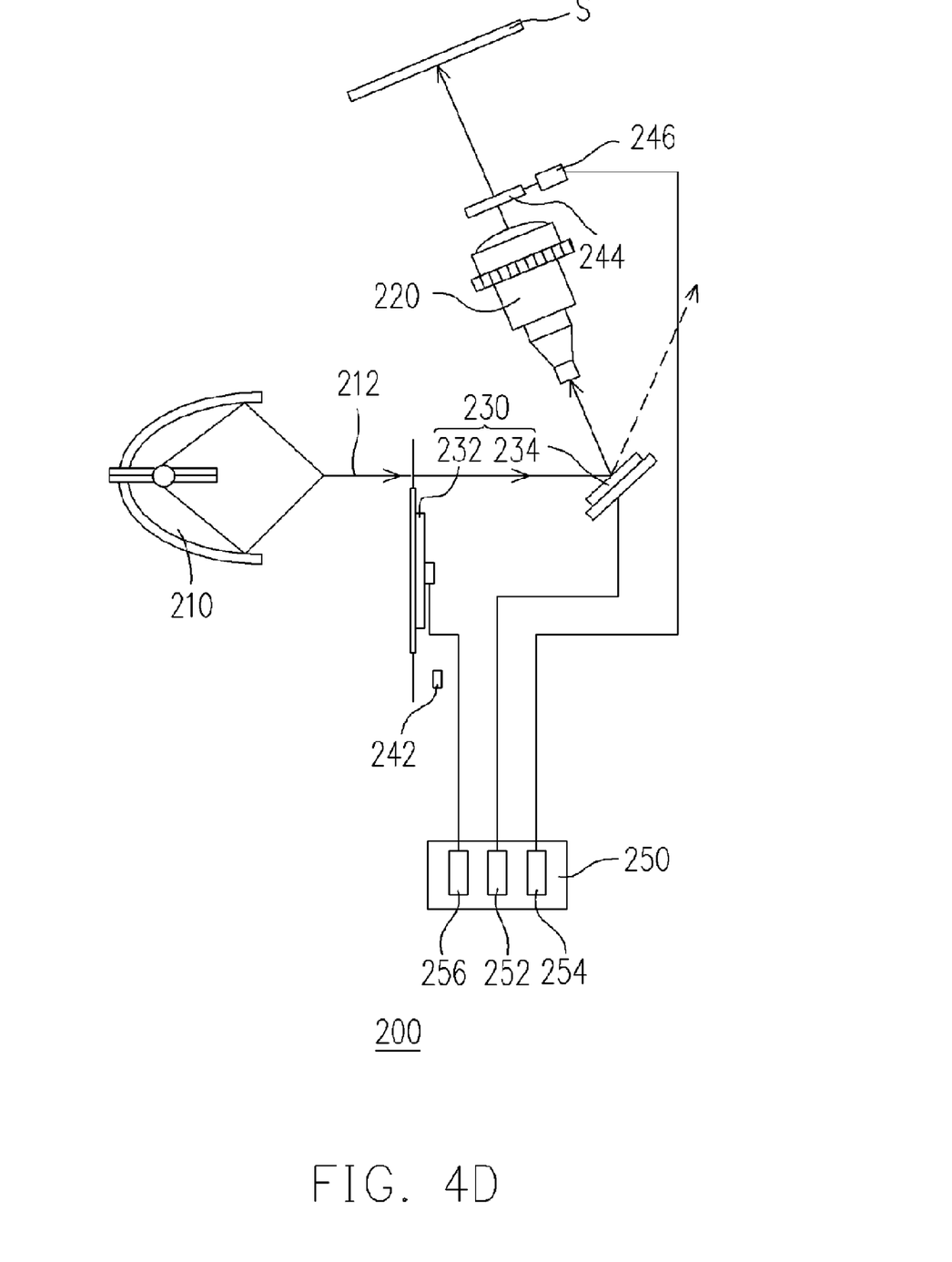

FIGS. 4A-4D are drawings, schematically illustrating disposing positions of the beam breaking part. In FIG. 2 and FIGS. 4A-4D, the location of the foregoing beam breaking part 244 is not limited to the way, as shown in FIG. 2, disposed in the image unit 230. The beam breaking part 244 can be disposed between the light source 210 and the screen S. As shown in FIG. 4A, the beam breaking part 244 can be, for example, disposed between the light source 210 and the image unit 230. FIG. 4A shows the location between the light source 210 and the color production device 232. In addition, as shown in FIG. 4B, the beam breaking part 244 can be disposed, for example, between the image unit 230 and the projection lens 220. As shown in FIG. 4B, the location is between the light valve 234 and the projection lens 220. In addition, the light breaking part 244 can, for example, disposed inside the projection lens 220, as shown in FIG. 4C, or is disposed between the projection lens 220 and the screen S, as shown in FIG. 4D.

Also referring to FIG. 2, the projection device having single light valve 200 of the invention can further include a control unit 250, so as to synchronously control the color production device 232, the light valve 234, and the beam breaker module 240. The control unit 250 can be, for example, a circuit board, which includes, for example, a light valve driver 252, an actuator driver 254, and a color production device driver 256. Wherein, the light valve driver 252 and the light valve 242 are electrically coupled. In addition, the actuator driver 254 and the actuator 246 are electrically coupled, so as to control the beam breaking part 244. Moreover, the color production device driver 256 and the color production device 232 are electrically coupled, wherein the light valve driver 252, the actuator driver 254, and the color production device driver 256 are used to synchronously control the light valve 234, the beam breaker module 240, and the color production device 232.

Figure 3:
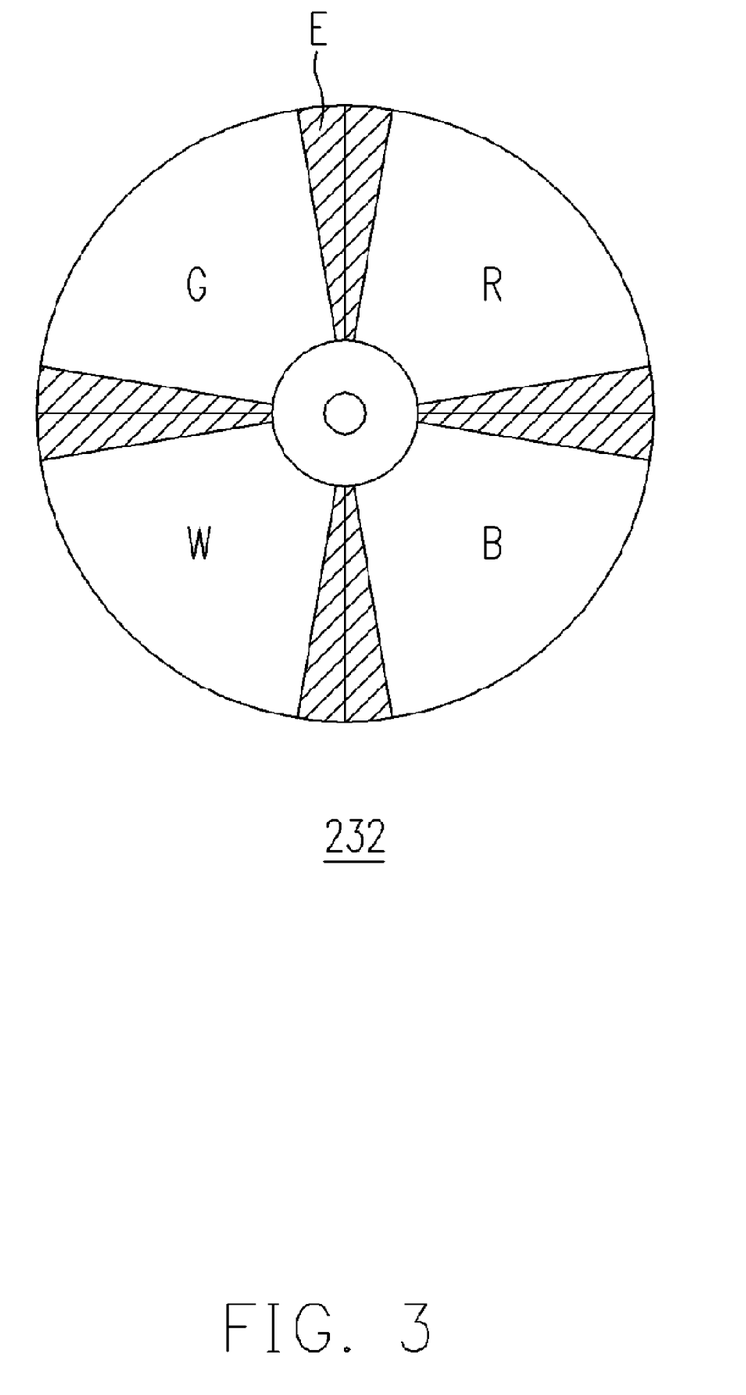
FIG. 3 is a cross-section view, schematically the structure cutting along the line I-I in FIG. 2.

FIG. 3 is a cross-section view, schematically illustrating the structure cutting along the line I-I in FIG. 2. In FIGS. 2 and 3, when the beam breaker module 240 cuts in the propagation path of the light beam, the light beam 212 provided from the light source 210 propagates to the color production device 232 of the image unit 230. The color production device 232 can be, for example, a color wheel having a red filtering region R, a green filtering region G, a blue filtering region B, and a white filtering region W. Then, the color production device driver 256 of the control unit 250 synchronously controls the color production device 232 being electrically coupled thereto, so as to divide the light beam 212 into light beams with different color in an order, such as the light beams 212 in the order of a red light, a green light, a blue light, and a white light. In addition, the optical sensor 242 being disposed beside the color production device 232 would sense the state of the color production device 232, and a synchronous signal, which represents the state of the color production device 232, is sent back to the control unit 250. Then, these light beams 212 are sequentially propagating to the beam breaking part 244. At this moment, the control unit 250 controls the actuator 246 by the actuator driver 254, according to the synchronous signal sent from the optical sensor 242, so as to further control the beam breaking part 244 to break the passing light beam 212 Within a specific period. In the embodiment, for example, the passing light beam 212, which has passed through the white filtering region W, can be broken. Or, for example, the noise light caused by the interfacing region E between the filtering regions can be broken, so as to improve the color saturation level of the image. In the embodiment, it can break the light beam 212 passing the white filtering region W and the noise light caused by the interfacing region E between the filtering regions, so as to both improving the color saturation level of the image and the contrast. After then, the light beams without being broken would enter a light valve 234. The light valve 234 includes, for example, a liquid crystal display (LCD), a digital micro-lens device (DMD), or a reflective-type LCOS. In the embodiment, a DMD with multiple pixel units is taken as an example as the light valve 232 for description. The pixel units of the light valve 232 are synchronously controlled byte electrically coupled light valve driver 252, so as to respectively have the ON states or the OFF states. The pixel unit with the ON state would cause the light beam 212 to be reflected to the projection lens 220. The pixel unit with OFF state would cause the light beam 212 to be off the projection lens 220. After then, the projection lens 220 projects the light beam 212 (image), which has been processed by the light valve 232, to the screen S.

When the beam breaker module 240 cuts out the propagation path of the light beam, the manner for displaying image on the screen S can be referred to FIG. 1, the light beam 112 provided from the light source 110 propagates to the color wheel 132. Then, the color wheel driver 156 of the control unit 150 controls the color wheel 132, which is electrically coupled thereto. As a result, the light beam 212 is divided into several light beams 212 in different color by an order. Then, the light beams 212 sequentially enter the DMD 134 with multiple pixel units. The pixel units are controlled by the DMD driver 152 being electrically coupled thereto, so as to have the ON state and the OFF state. The pixel unit with the ON state would cause the light beam 112 to be reflected to the projection lens 120. The pixel unit with OFF state would cause the light beam 112 to be off the projection lens 120. After then, the projection lens 120 projects the light beam 112 (image), which has been processed by the light valve 132, to the screen S.

In the embodiment, the beam breaker module 240 is used, so that the projection device having single light valve 200 can be used in various operation modes with high contrast, such as high brightness mode (briefing mode) and the high contrast mode (vide mode). When it needs the image with high brightness, for example, in briefing, the projection device having single light valve 200 can be switched to the high brightness mode. In this mode, the beam breaker module 240 would cut out from the propagation path of the light beam, so as to allow all of the red, green, blue and white light beam 212 to pass, and thereby to have high brightness for the projected image (not shown). In addition, when an image needs high color saturation level and high contrast, such as in viewing the movie, the projection device having single light valve 200 is switched to high contrast mode. In this mode, the beam breaker module 240 would cut in the propagation path of the light beam, so as to break the passing light beam within a specific time period. For example, it breaks the light beam 212 passing through the white filtering region W and the noise light caused by the interfacing region E between the filtering regions. This method can let the image be purely produced by the red light, green light, or blue light, whereby the image color saturation level can be improved, and, even though the brightness of the white image in this mode is reduced, the noise light due to the interfacing region E between the filtering regions can be broken. This can reduce the brightness of the dark image, so that the image contrast can be maintained. The data is shown in the following Table 2 to show the contrast.

TABLE 2

|  | Brightness for white image | Brightness for dark image | Contrast |
|---|---|---|---|
| Hight brightness mode | 1000 (Lux) | 1 (Lux) | 1000 |
| High color saturation mode | 500 (Lux) | 0.5 (Lux) | 1000 |

In summary, the projection device having single light valve of the invention uses a beam breaker module, which can selectively cut in or cut out from the propagation path of the light beam, and can cut in the propagation path of the light beam to break the passing light beam within a specific time period according to the state of the color production device. As a result, it allows the projection device having single light valve to adapt to various operation modes with the consideration of image contrast at the same time.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A projection device having single light valve, suitable for projecting an image to a screen, the projection device comprising:
    a light source, for providing a light beam;
    a projection lens, disposed behind the light source, and located on a propagation path of the light beam;
    an image unit, disposed between the light source and the projection lens, and located on the propagation path of the light beam, wherein the image unit comprises a color production device and a light valve disposed behind the color production device, and located on the propagation path of the light beam, wherein the color production device comprises a plurality of filtering regions corresponding to a plurality of color lights of the light beam, and each of the filtering regions being on the propagation path indicates a state of the color production device; and
    a beam breaker module, disposed between the light source and the screen, and the beam breaker module selectively cutting in or cutting out from the propagation path of the light beam, wherein when the beam breaker module cuts in the propagation path of the light beam, the beam breaker module blocks the light beam passing through a part of the filtering regions, and when the beam breaker module cuts out from the propagation path of the light beam, the light beam passing through the other pan of the filtering regions is projected to the screen by the projection lens.

2. The projection device of claim 1, wherein the beam breaker module comprises:
    an optical sensor, disposed beside the color production device, so as to sense the state of the color production device;
    a beam breaking part, disposed between the light source and the screen; and
    an actuator, coupled with the beam breaking part, so as to control the beam breaking part to cut in or cut out from the propagation path of the light beam.

3. The projection device of claim 2, wherein the beam, breaking part is disposed between the light source and the image unit.

4. The projection device of claim 2, wherein the beam breaking part is disposed in the image unit.

5. The projection device of claim 2, wherein the beam breaking part is disposed between the image unit and the projection lens.

6. The projection device of claim 2, wherein the beam breaking part is disposed in the projection lens.

7. The projection device of claim 2, wherein the beam breaking part is disposed between the projection lens and the screen.

8. The projection device of claim 2, further comprising a control unit, wherein the control unit comprises:
    a light valve driver, electrically coupled with the light valve;
    an actuator driver, electrically coupled with the actuator to control the beam breaking part; and
    a color production device driver, electrically coupled with the color production device,
    wherein the light valve driver, the actuator driver, and the color production device driver are used to synchronously control the light valve, the beam breaker module, and the color production device.

9. The projection device of claim 1, further comprising a control unit, to synchronously control the color production device, the light valve, and the beam breaker module.

10. The projection device of claim 1, wherein the color production device comprises a color wheel.

11. The projection device of claim 10, wherein the filtering regions of the color production device has a red filtering region, a green filtering region, and a blue filtering region.

12. The projection device of claim 10, wherein the filtering region of the color production device has a red filtering region, a green filtering region, a blue filtering region, and a white filtering region.

13. The projection device of claim 1, wherein the color production device comprises a color drum.

14. The projection device of claim 13, wherein the filtering region of the color production device has a red filtering region, a green filtering region, and a blue filtering region.

15. The projection device of claim 13, wherein the filtering regions of the color production device has a red filtering region, a green filtering region, a blue filtering region, and a white filtering region.

16. The projection device of claim 1, wherein the filtering regions comprises a white filtering region or an interfacing region between two of the filtering regions, and the beam breaker module blocks the light beam passing through a white filtering region or an interfacing region between two of the filtering regions.

17. A projection device having single light valve, having a first operation mode and a second operation mode, suitable for projecting an image to a screen, the projection device comprising:

a light source, for providing a light beam;

a projection lens, disposed behind the light source, and located on a propagation path of the light beam;

an image unit, disposed between the light source and the projection lens, and located on the propagation path of the light beam, wherein the image unit comprises a color production device and a light valve disposed behind the color production device, and located on the propagation pat of the light beam, wherein the color production device comprises a plurality of filtering regions corresponding to a plurality of color lights of the light beam, and each region being on the propagation path indicates a state of the color production device; and a beam breaker module, disposed between the light source and the screen, the beam breaker comprising an optical sensor disposed beside the color production device, so as to sense the state of the color production device, wherein when the projection device is at the first operation mode, the beam breaker module cuts in the propagation path of the light beam to break the light beam passing through a part of the filtering regions, and when the projection device is at the second operation mode, the beam breaker module cuts out from the propagation path of the light beam passing through the other part of the filtering regions to project to the screen by the projection lens.

18. The projection device of claim 17, wherein the beam breaker module further comprises:

a beam breaking part, disposed between the light source and the screen; and an actuator, coupled with the beam breaking part, so as to control the beam breaking part to cut in or cut out from the propagation path of the light beam.

19. The projection device of claim 17, wherein the first operation mode is a high color saturation mode and the second operation mode is a high brightness mode.

20. The projection device of claim 17, wherein the filtering regions comprises a white filtering region or an interfacing region between two of the filtering regions, and the beam breaker module blocks the light beam passing through the white filtering region or the interfacing region between two of the filtering regions.

* * * * *